United States Patent

Katoh et al.

[11] Patent Number: 5,856,993
[45] Date of Patent: Jan. 5, 1999

[54] GAS LASER OSCILLATOR

[75] Inventors: Takuma Katoh, Sanda; Hidehiko Karasaki, Ashiya; Hitoshi Hongu, Kawanishi, all of Japan

[73] Assignee: Matsushita Electric Industrial CO. LTD., Osaka-Fu, Japan

[21] Appl. No.: 995,942

[22] Filed: Dec. 22, 1997

Related U.S. Application Data

[63] Continuation of Ser. No. 295,015, Aug. 24, 1994.

[51] Int. Cl.⁶ .................................................. H01S 3/22
[52] U.S. Cl. ................................ 372/58; 372/59; 372/55
[58] Field of Search .................................. 372/58, 59, 55

[56] References Cited

U.S. PATENT DOCUMENTS

| | | |
|---|---|---|
| 4,573,162 | 2/1986 | Bakowsky et al. . |
| 4,672,621 | 6/1987 | Morita et al. . |

FOREIGN PATENT DOCUMENTS

| | | |
|---|---|---|
| 109025 | 5/1984 | European Pat. Off. . |
| 130346 | 1/1985 | European Pat. Off. . |
| 314810 | 12/1988 | European Pat. Off. . |
| 439608 | 8/1991 | European Pat. Off. . |
| 6398165 | 4/1988 | Japan . |
| 1204486 | 8/1989 | Japan . |
| 1218081 | 8/1989 | Japan . |

OTHER PUBLICATIONS

Patent abstract of Japan, vol. 12, No. 287 (E–643) (3134) Aug. 1988 re Jp–A–63–64377.
Patent abstract of Japan, vol. 12, No. 211 (E–622) (3058) Jun. 1988 re JP–A 63–9178.
Patent abstract of Japan, vo. 11, No. 325 (E–551) (2772) Oct. 1987 re JP–A–62–114282.

*Primary Examiner*—Leon Scott Jr.
*Attorney, Agent, or Firm*—Cushman Darby Cushman IP Group of Pillsbury Maison & Sutro LLP

[57] ABSTRACT

A gas laser oscillator has at least a partial reflection unit and a total reflection unit, each of which comprises an extension unit for connecting between a gas introducing unit and a fixed block unit. The gas introducing unit has a gas inlet port for circulating laser gas in a laser tube, and the fixed block unit is provided for fixing a reflector. A gas inlet port of the gas introducing unit is arranged with a predetermined interval of 120 mm or more so that the reflectors are free from contamination by floating powders and deterioration by ultraviolet lays.

11 Claims, 11 Drawing Sheets

GAS LASER OSCILLATOR

This is a continuation of application Ser. No. 08/295,015, filed Aug. 24, 1994.

BACKGROUND OF THE INVENTION

1. Field of the Invention

The present invention relates to a gas laser oscillator in which laser gas is circulated in a laser tube, and from which a laser beam excited in a discharge area in the laser tube is output.

2. Description of the Related Art

In recent years, gas laser oscillators are widely used for drilling, cutting, welding or treating the surface of materials having a high hardness, and there is a great demand particularly in the area of factory automation.

Figure 11:
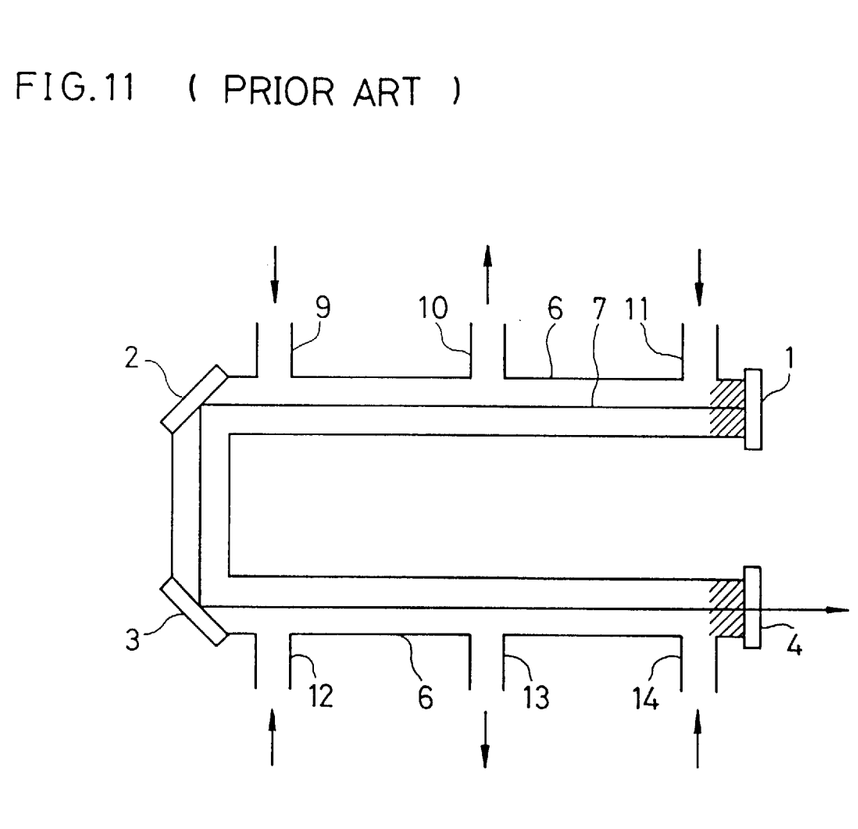
FIG. 11 is the schematic plan view of a conventional gas laser oscillator.

One example of a conventional gas laser oscillator is shown in FIG. 11. The conventional gas laser oscillator of FIG. 11 is disclosed in the Gazette of the Japanese unexamined patent application No. Tokkai Hei 1-204486. FIG. 11 shows a schematic plan view of the conventional gas laser oscillator. The conventional gas laser oscillator comprises a laser tube 6 made of dielectric material such as glass, a total reflector 1 disposed at one end of the laser tube 6, return-beam reflectors 2, 3 for directing a laser beam 7 in the laser tube 6 and a partial reflector 4 disposed at the other end of the laser tube 6. As shown in FIG. 11, the laser beam 7 excited in the laser tube 6 is output through the partial reflector 4. The laser gas is led into the laser tube 6 from gas inlet ports 9, 11, 12 and 14, and exhausted from gas outlet ports 10 and 13. In FIG. 11, the directions of the gas-flow are indicated by short arrows. A pair of the laser tubes 6 are arranged in parallel, and connected in series so as to reflect laser beam 7 between the total reflector 1 and the partial reflector 4 via return-beam reflectors 2, 3.

As mentioned above, the conventional gas laser oscillator provides the gas inlet ports 9, 11, 12 and 14 adjacent to the total reflector 1, the return-beam reflectors 2, 3 and the partial reflector 4. The laser gas is supplied to the laser tube 6 via gas inlet ports 9, 11, 12 and 14 by a gas circulation apparatus thereby providing a high velocity gas-flow in the laser tube 6. That is, the total reflector 1, the return-beam reflectors 2, 3 and the partial reflector 4 are disposed in the gas flow. The laser gas includes floating powders, oil mists, dusts or the like brought from mechanical portions etc. of the gas laser oscillator. Such floating powders etc. are apt to stick to mirror portions of the total reflector 1, the return-beam reflector 2, 3 and the partial reflector 4. These mirror portions become more and more soiled with such powders etc. as time passes. As a result, the output of the conventional gas laser oscillator gradually decreases as time passes owing to the soiled mirrors.

Furthermore, because the total reflector 1, the return-beam reflectors 2, 3 and the partial reflector 4 are disposed near the discharge regions, which is formed between a respective pair of electrodes, these reflectors 1, 2, 3 and 4 are deteriorated by ultraviolet rays emitted from the discharge region, thereby decreasing the life time of the conventional gas laser oscillator.

SUMMARY OF THE INVENTION

The present invention purposes to solve the above-mentioned problems in the conventional gas laser oscillator, and aims to provide a gas laser oscillator wherein reflectors are prevented from being soiled by the floating powders etc. in the laser gas and from being deteriorated by the ultraviolet rays emitted from discharge region.

Through experimental studies, the inventors found that providing an interval between the reflector and a gas inlet port gives decreases the amount of powders etc. that stick to the reflector and decreases the deterioration caused by the ultraviolet rays. The present invention is made based on the above-mentioned experimental research.

The gas laser oscillator in accordance with the present invention comprises: a laser tube in which laser gas is circulated, a partial reflection unit which is disposed at one end of the laser tube and has a partial reflector for reflecting and outputting a laser beam, a total reflection unit which is disposed at the other end of the laser tube and has a total reflector for totally reflecting the laser beam in the laser tube, a pair of electrodes which are disposed so as to surround the laser tube, and a first gas introducing unit having a first gas inlet port which is arranged to lead laser gas into one end of the laser tube and is disposed with an interval of 120 mm or more between a center of the first gas inlet port and an inner surface of said partial reflector.

According to the present invention, because the reflectors of the gas laser oscillator are disposed at a predetermined interval from the gas inlet ports and the discharge region, the reflectors are prevented from being soiled by floating powders etc. and from being deteriorated by the ultraviolet lays of the discharge regions thereby increasing the life of the gas laser oscillator.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

Figure 1:
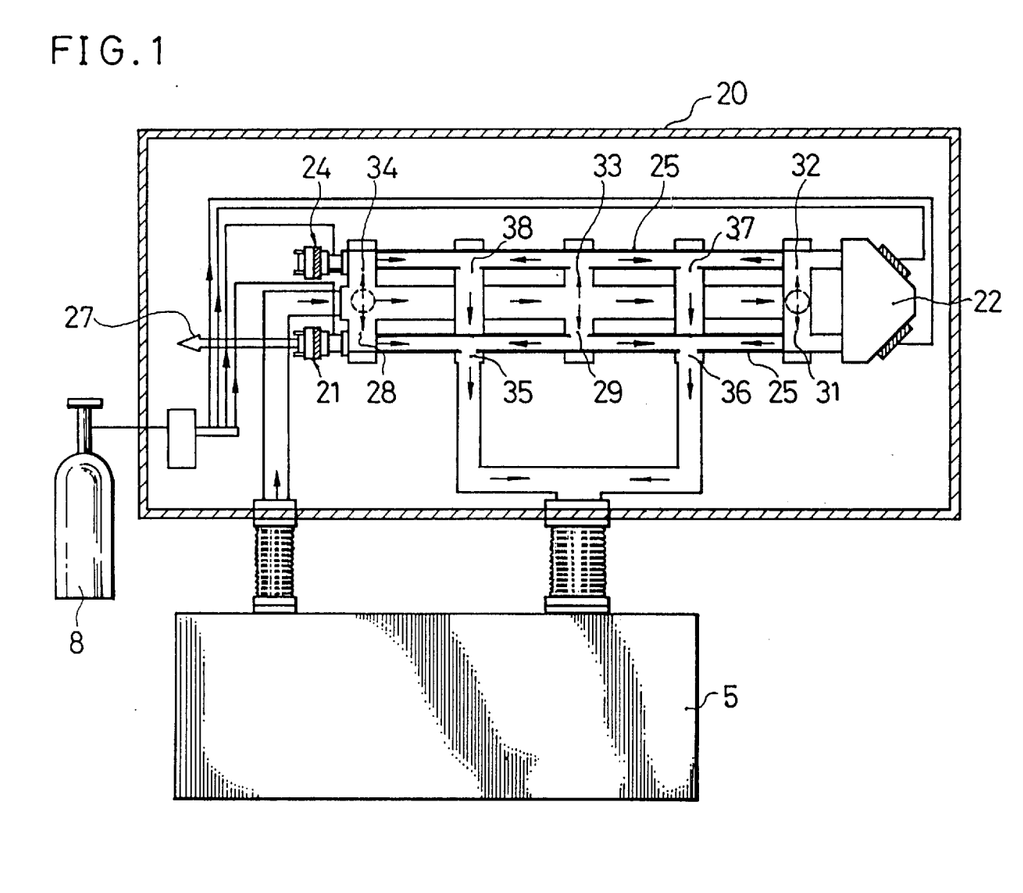
FIG. 1 is a schematic plan view of a gas laser oscillator in accordance with a first embodiment of the present invention.
Figure 2:
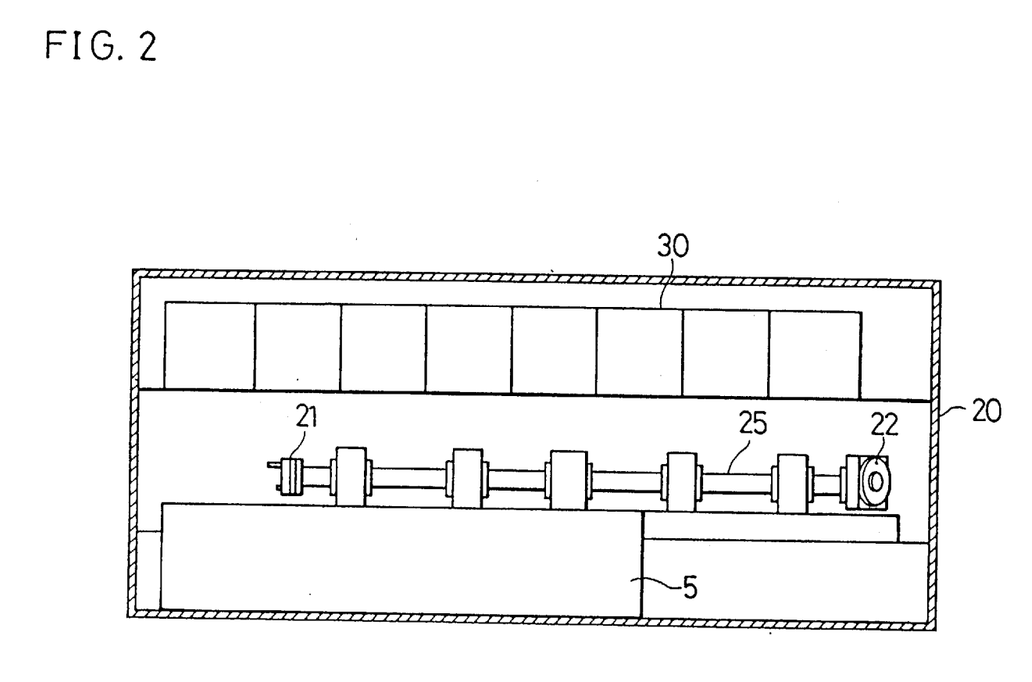
FIG. 2 is a side view of an optical resonator of the gas laser oscillator of FIG. 1.

Hereafter, preferred embodiments of the present invention will be described with reference to FIG. 1 through FIG. 10.
FIRST EMBODIMENT FIG. 1 is a schematic plan view of the gas laser oscillator of the first embodiment. FIG. 2 is a side view of an optical resonator 20 of the gas laser oscillator of FIG. 1.

As shown by short arrows in FIG. 1, laser gas is circulated by a gas circulation apparatus 5 for providing a high velocity gas-flow in laser tubes 25 of an optical resonator 20. The optical resonator 20 has a power supply unit 30 (shown in FIG. 2) for exciting the laser gas in the laser tube 25 so as to form a discharge region in the laser tube 25. The optical resonator 20 comprises reflectors having reflecting surfaces which are aligned to provide multiple reflections so that a laser beam 27 is amplified and output prom the optical resonator 20.

The optical resonator 20 includes laser tubes 25, a partial reflection unit 21 for reflecting and outputting the laser beam 27, a return-beam reflection unit 22 for directing the laser beam 27, and a total reflection unit 25 for totally reflecting the laser beam 27. In the optical resonator 20, the laser beam 27 is reflected and amplified between the partial reflection unit 21 and the total reflection unit 24 via return-beam reflection unit 22, and the laser beam 27 is output through the partial reflection unit 21.

The laser gas to be supplied to the laser tubes 25 is a gas mixture such as of $CO_2$, $N_2$, and He. The laser gas is led into the laser tube 25 from gas inlet ports 28, 29, 31, 32, 33 and 34, and is led out from the gas outlet ports 35, 36, 37 and 38. Two sets of the laser tubes 25 having electrodes for generating discharge regions are arranged in parallel as shown in FIG. 1 and are connected in series to reflect the laser beam 27 between partial reflection unit 21 and the total reflection unit 24. The laser gas is supplied from a laser gas cylinder 8 to the laser tubes 25 through the partial reflection unit 21, the return-beam reflection unit 22 and total reflection unit 24 when the pressure of the laser gas falls below the predetermined pressure.

Figure 3:
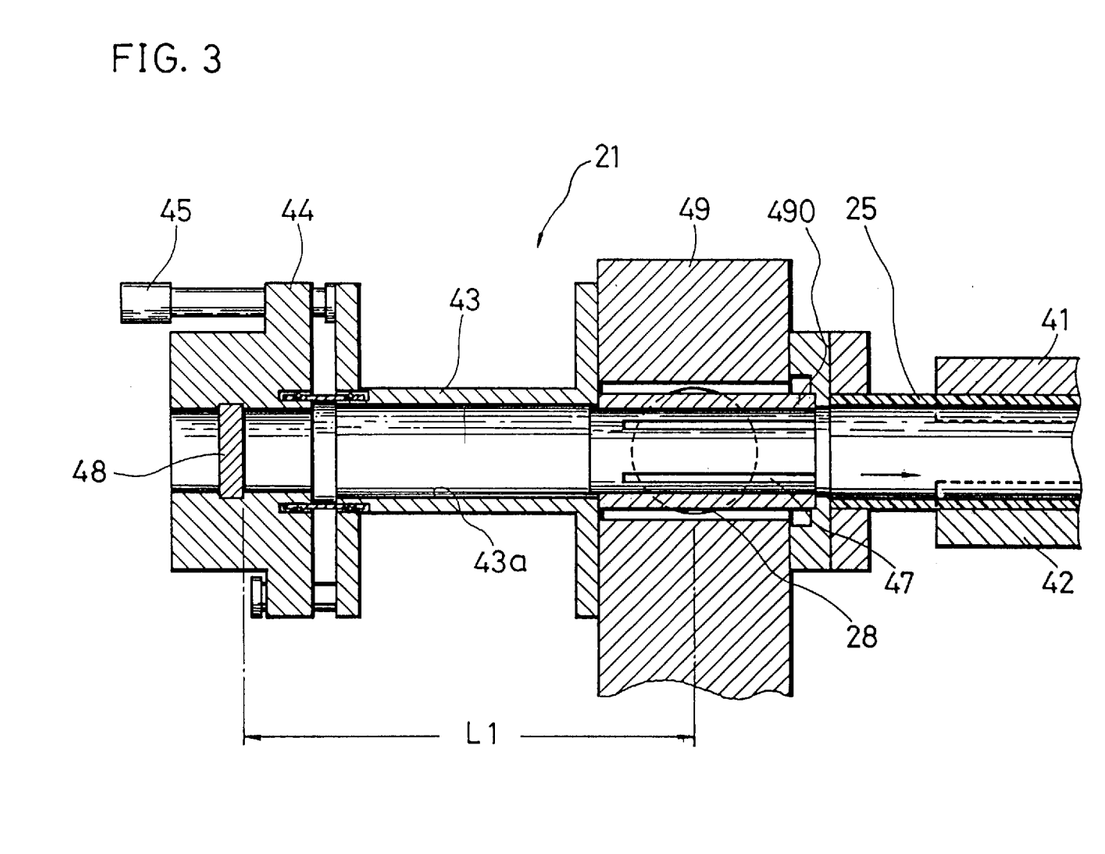
FIG. 3 is a sectional side view showing a partial reflection unit of the gas laser oscillator of FIG. 1.
Figure 4:
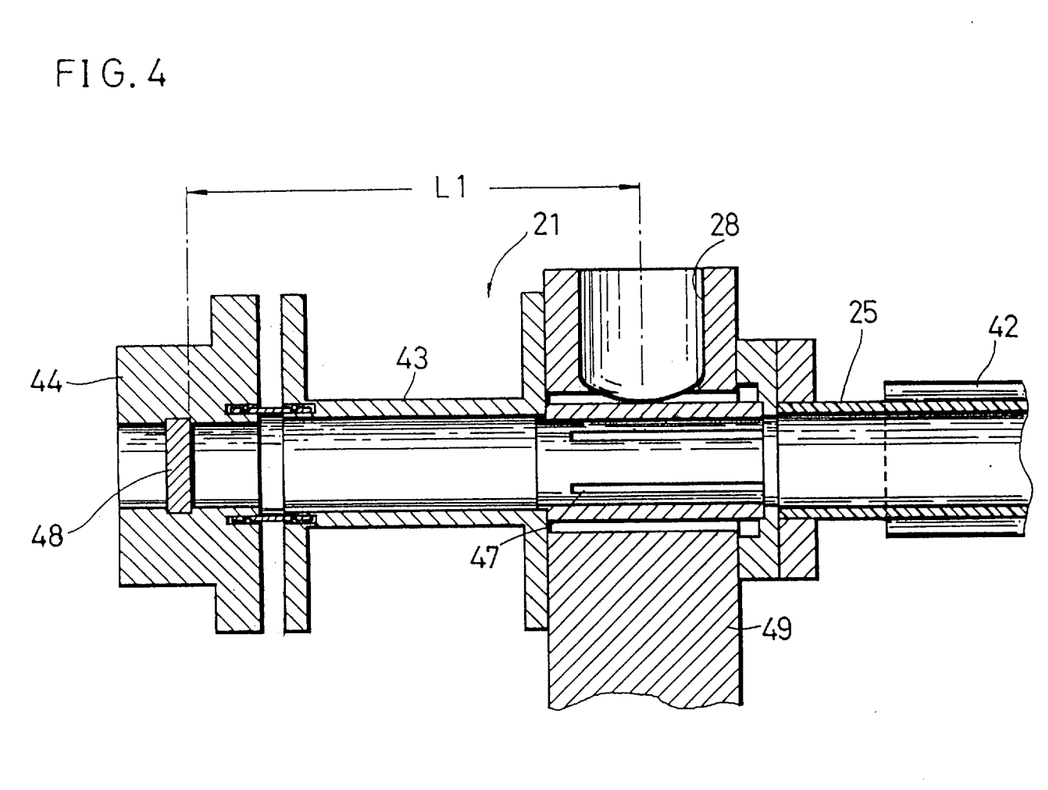
FIG. 4 is a sectional plan view showing the partial reflection unit of FIG. 3.

FIG. 3 is a sectional side view of the partial reflection unit 21. FIG. 4 is a sectional plan view of the partial reflection unit 21 of FIG. 3.

As shown in FIGS. 3 and 4, the partial reflection unit 21 comprises a gas introducing unit 49 which is provided at the end of the laser tube 25 having a pair of electrodes 41, 42, a fixed block unit 44 for fixing a partial reflector 48, and a first extension flange unit 43. The gas introducing unit 49 and the fixed block unit 44 are connected with the first extension flange unit 43 to form a through-hole 43a which is aligned with a through-hole of the laser tube 25. The partial reflector 48 is hermetically disposed in the through-hole 43a so as to make multiple reflections between the partial reflector 48 and a total reflector disposed at the other end of the laser tube 25. The gas introducing unit 49 has the gas inlet port 28 for leading the laser gas provided by the gas circulation apparatus 5. The laser gas led into the gas inlet port 28 flows through plural slits 47, which are formed in an axial direction of the laser tube 25 at an inner tube 490 of the gas introducing unit 49. The plural slits 47 provide a desired gas-flow in the laser tube 25. The fixed block unit 44 has adjusting screws 45 for controlling the reflecting angle of the partial reflector 48.

In the first embodiment, an interval L1 (shown in FIG. 3) of no less than 120 mm and optimally substantially 120 mm is given by inserting the first extension flange unit 43 between the fixed block unit 44 and the gas introducing unit 49 having the gas inlet port 28 thereon. The interval L1 is a distance between the center of the gas inlet port 28 and the inner surface of the partial reflector 48. Because the first extension flange unit 43 is provided in the partial reflection unit 21 to arrange the partial reflector 48 at the interval L1 of 120 mm or more from the gas inlet port 28, almost all the laser gas flows from the gas inlet port 28 to the laser tube 25 through the plural slits 47, and the laser gas stands stagnant in the through-hole 43a adjacent to the partial reflector 48. Therefore, the partial reflector 48 is not exposed to the gas-flow including floating powders etc. As a result, substantially no floating powder sticks to the partial reflector 48, and the partial reflector 48 is kept at a clean state for a long time.

Figure 5:
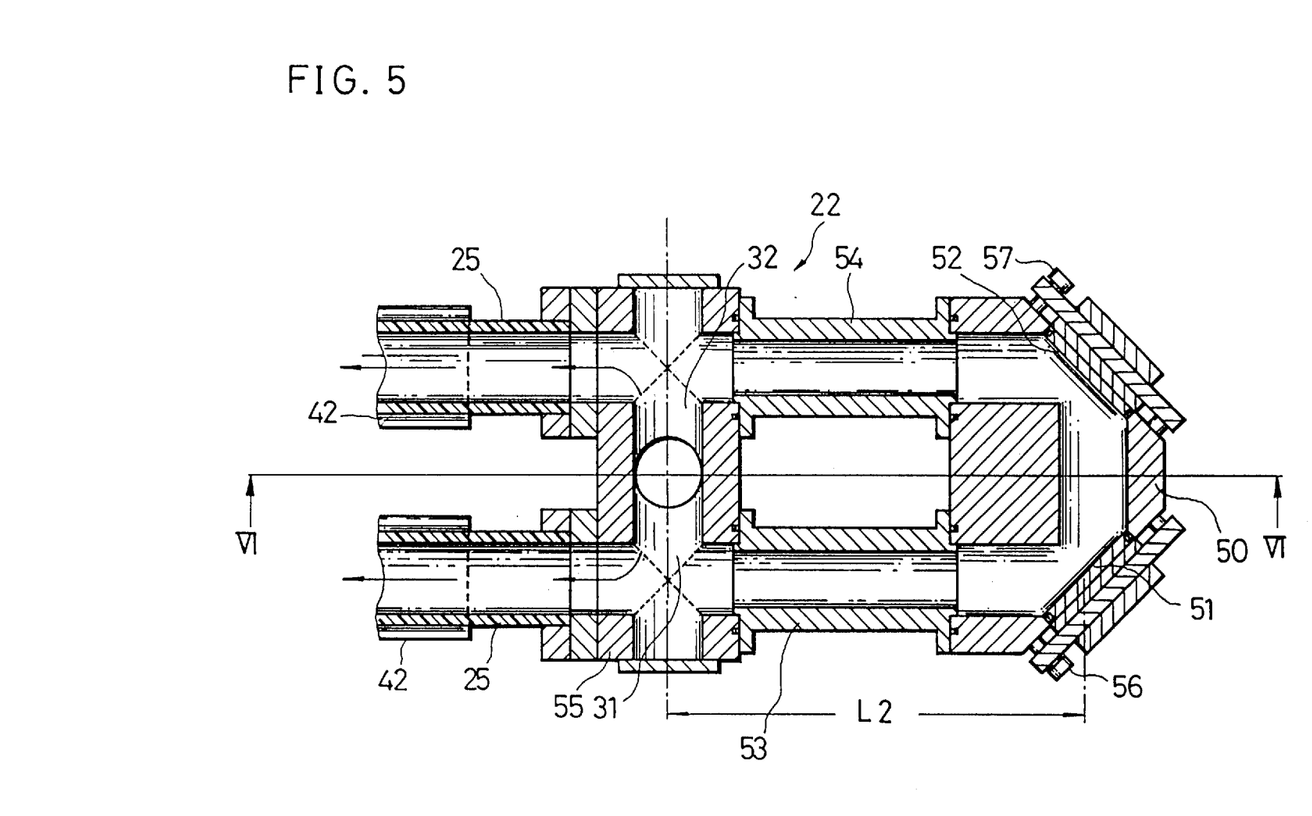
FIG. 5 is a sectional plan view showing a return-beam reflection unit in the gas laser oscillator of FIG. 1.
Figure 6:
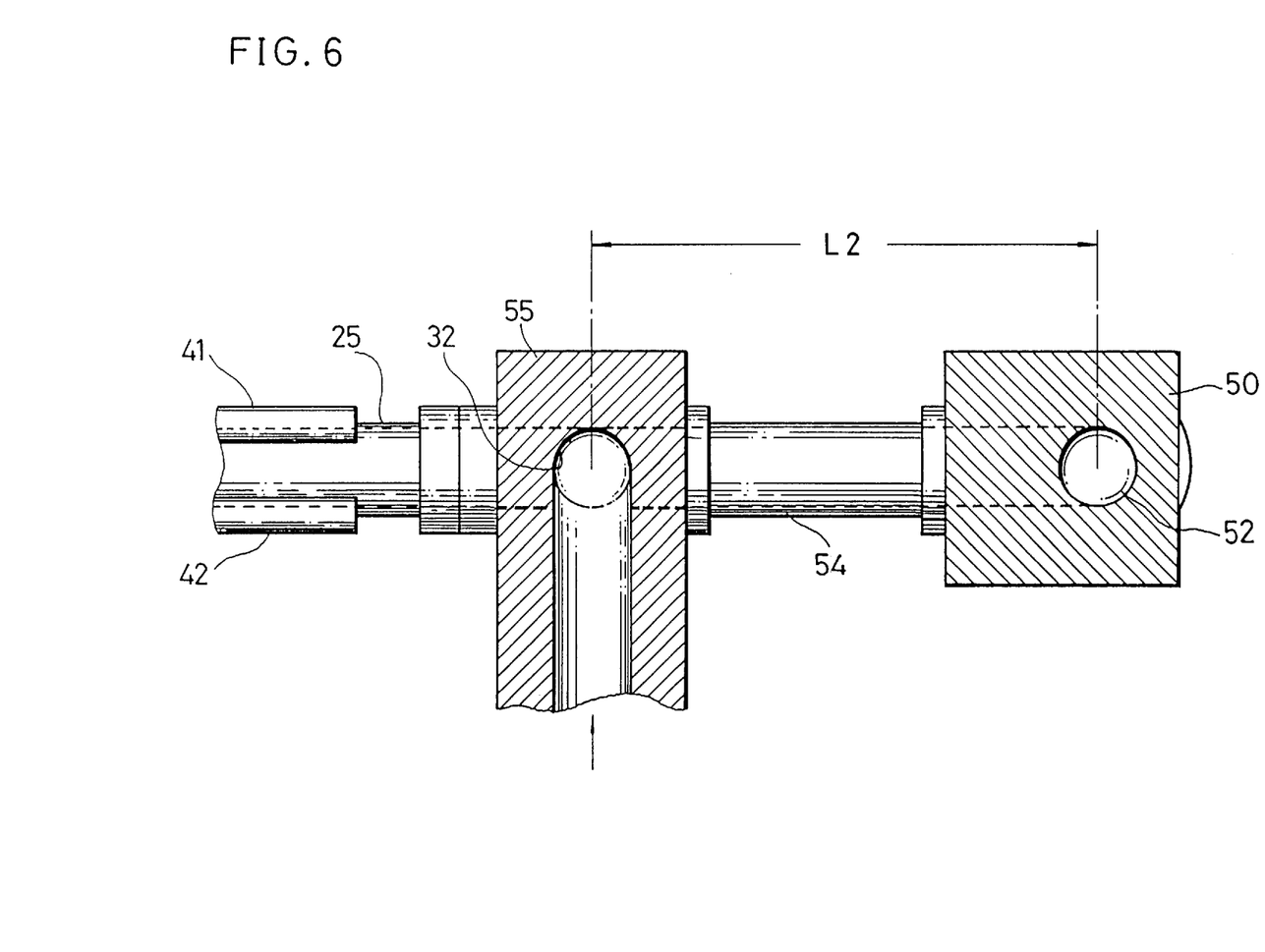
FIG. 6 is a sectional side view taken on the line VI—VI of FIG. 5 showing the return-beam reflection unit.

FIG. 5 is a sectional plan view of the return-beam reflection unit 22 of the gas laser oscillator of the first embodiment. FIG. 6 is a sectional side view taken on the line VI—VI of FIG. 5 showing the return-beam reflection unit 22.

In FIGS. 5 and 6, the return-beam reflection unit 22 comprises a gas introducing unit 55 which is arranged at the end of the laser tubes 25 in parallel having electrodes 41, 42, a fixed block unit 50 for fixing two return-beam reflectors 51, 52, and second extension flange units 53, 54. The gas introducing unit 55 and the fixed block unit 50 are connected with the second extension flange units 53, 54 as shown in FIGS. 5 and 6. The return-beam reflectors 51, 52 direct the laser beam 27 in order to make multiple reflections between the partial reflector 48 and the total reflector via the return-beam reflectors 51, 52.

The gas introducing unit 55 (FIGS. 5 and 6) has the two gas inlet ports 31, 32 where the laser gas circulated by the gas circulation apparatus is led into respective laser tubes 25. The fixed block unit 50 has a pair of adjusting screws 56, 57 for controlling the reflecting angle of respective return-beam reflectors 51, 52.

In the first embodiment, because the second extension flange units 53, 54 are provided between the fixed block unit 50 and the gas introducing unit 55, the gas inlet ports 31, 32 are arranged to have an interval L2 (shown in FIG. 5) of 120 mm or more, and optimally substantially about 120 mm. The interval L2 shows a distance between the center of the gas inlet ports 31, 32 and the center of the facing surfaces of the return-beam reflectors 51, 52.

By providing the second extension flange units 53, 54 in the return-beam reflection unit 22, the interval L2 between the return-beam reflectors 51, 52 and the gas inlet ports 31, 32 is about 120 mm or more. Therefore, almost all the gas-flow is led into the laser tubes 25, 25 from the gas inlet ports 31, 32, as shown by short arrows in FIG. 5. In addition, laser gas stands stagnant in the hole adjacent to the return-beam reflectors 51, 52 of the fixed block unit 50. Therefore, the return-beam reflectors 51, 52 are not exposed to the gas-flow including floating powders etc. As a result, substantially no floating powder sticks to the return-beam reflectors 51, 52, and therefore, the return-beam reflectors 51, 52 are kept in a clean state for a long time.

The total reflection unit 24 is constructed by the same configuration as the aforementioned partial reflection unit 21 shown in FIGS. 3 and 4 except that a total reflector for totally reflecting the laser beam 27 (as a mirror) is used instead of the partial reflector 48.

Figure 7:
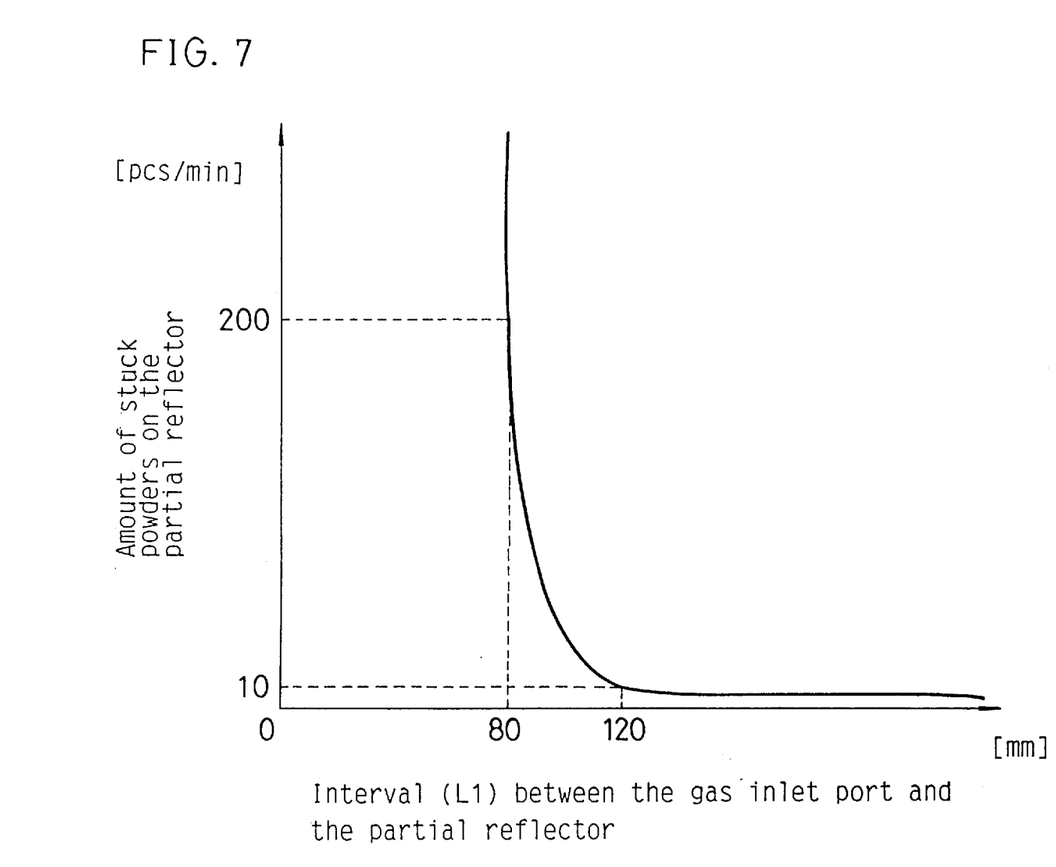
FIG. 7 is a graph showing a relation between the amount of powders stuck to a reflector and a position of a gas inlet port.

FIG. 7 is a graph of a relation between the amount of powders stuck on the partial reflector 48 and the interval L1 between the gas inlet port 28 and the partial reflector 48.

The graph of FIG. 7 shows data obtained by detecting the amount of powders having a diameter of 0.2 μ/m or more that are stuck to the partial reflector 48 in the following conditions:

The laser tube 25 has an inside diameter of 40 mm, the laser gas flows at a speed of 300 m/sec, and a pressure of 150 Torr of the laser gas is applied.

As is apparent from the graph of FIG. 7, in a case where the interval L1 between the gas inlet port 28 and the partial reflector 48 is less than 120 mm, more powders are stuck to the partial reflector 48 as the interval L1 is shorter. However, in a case where the interval L1 is more than 120 mm, the amount of the stuck powders on the partial reflector 48 is a constant regardless of the change of the interval L1.

Figure 8:
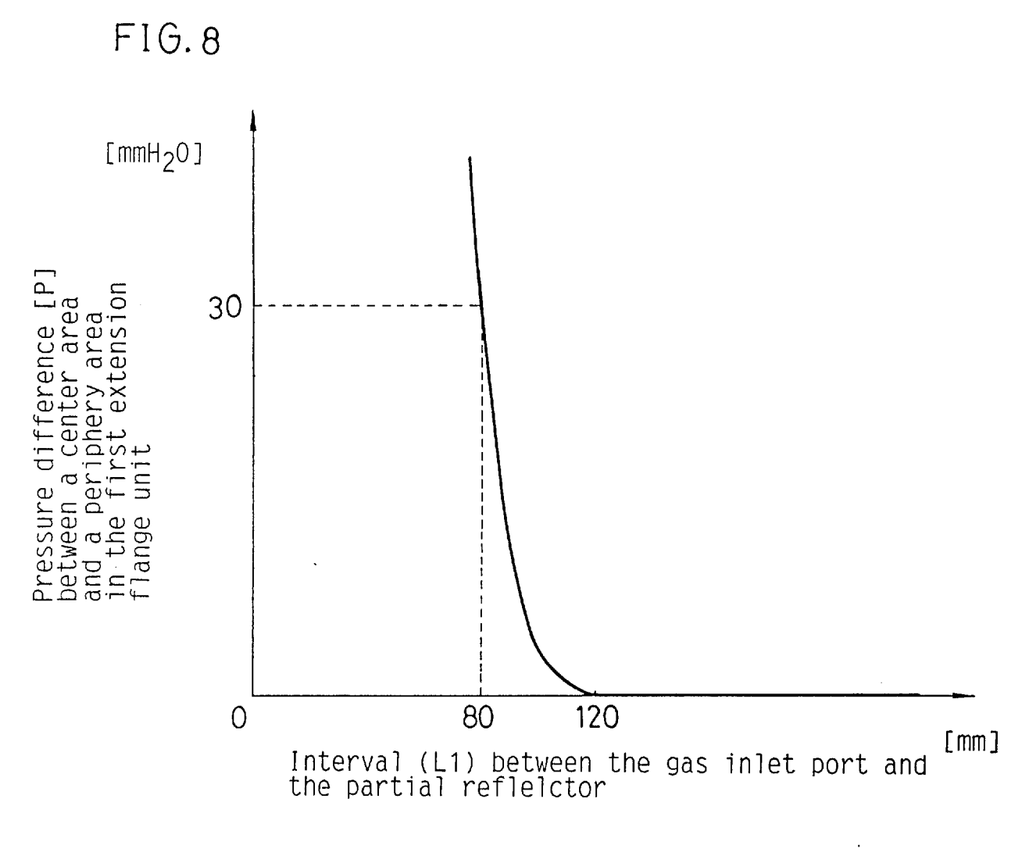
FIG. 8 is a graph showing a relation between a pressure and a position in the partial reflection unit.

FIG. 8 is a graph of a relation between pressure difference in the through-hole 43a (shown in FIG. 3) of the first extension flange unit 43 and the interval L1. The pressure difference is measured as a difference between that at a center area of the through-hole 43a of the first extension flange unit 43 and that at a periphery area adjacent to the inner wall of the through-hole 43a.

The graph of FIG. 8 shows data obtained by detecting the amount of powders having a diameter of 0.2 μm or more tjat are stuck to the partial reflector 48 in the following conditions:

The laser tube 25 has an inside diameter of 40 mm, the laser gas flows at a speed of 300 m/sec, and a pressure of 150 Torr of the laser gas is applied.

As shown in FIG. 8, the pressure difference P is substantially zero at the interval L1 of 120 mm or more. In other words, the laser gas stands stagnant at the interval L1 of 120 mm or more.

According to the inventor's experiments, the above-mentioned relations shown in FIGS. 7 and 8 also apply in the following conditions:

The laser tube 25 has an inside diameter of below 40 mm, the laser gas flows at a speed of below 300 m/sec, and a pressure of below 150 Torr of the laser gas is applied.

Accordingly, when the partial reflector 48 is arranged at the interval L1 of 120 mm or more from the gas inlet port 28 as the above-mentioned first embodiment, the amount powders stuck to the partial reflector 48 remarkably decreases.

According to the inventor's experiments, the above-mentioned relations between the interval L1 and the amount of the powders stuck to the reflectors also applies in the return-beam reflection unit 22 and the total reflection unit 24.

SECOND EMBODIMENT

Figure 9:
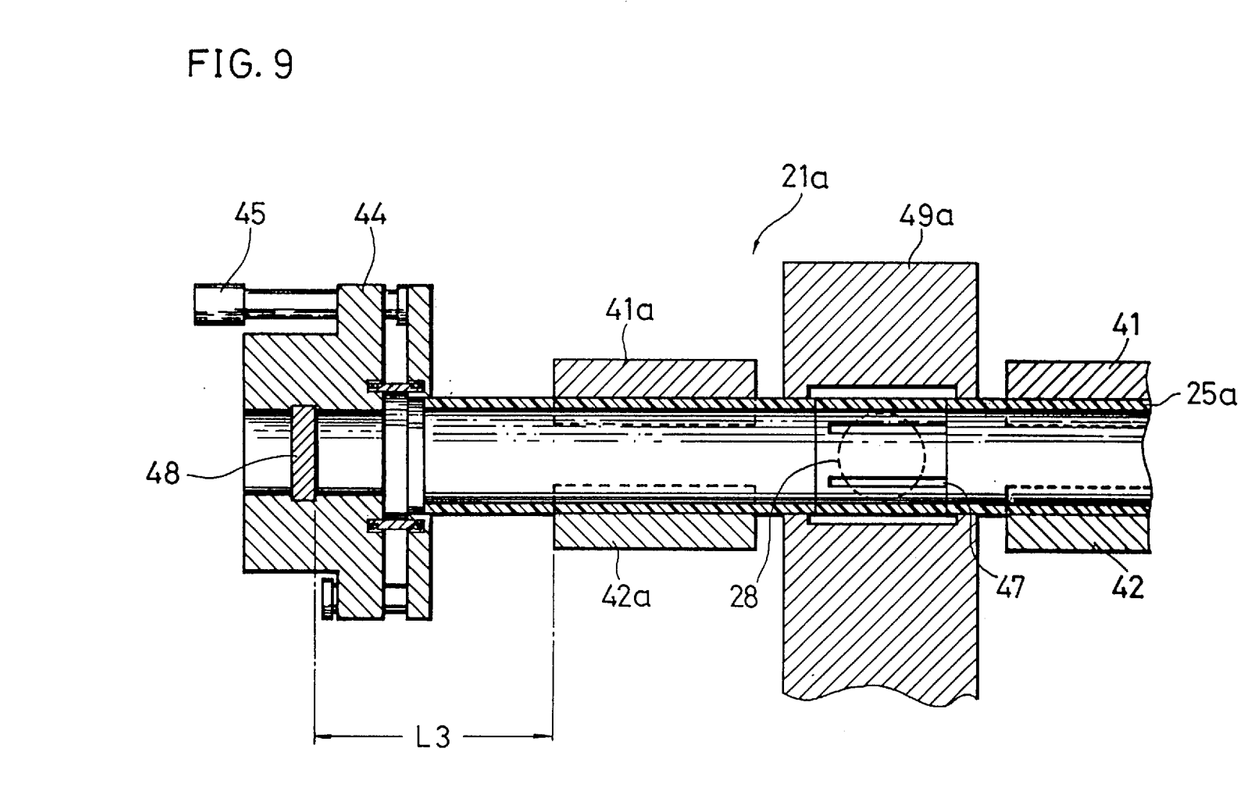
FIG. 9 is a sectional side view showing a partial reflection unit of a gas laser oscillator in accordance with a second embodiment of the present invention.

FIG. 9 is a sectional side view of a partial reflection unit 21a of a gas laser oscillator in accordance with a second embodiment of the present invention. Parts and components corresponding to the first embodiment are shown by-the same numerals and marks, and the description thereon made in the first embodiment similarly applies. Differences and features of this second embodiment from the first embodiment are as follows.

As shown in FIG. 9, the partial reflection unit 21a has a fixed block unit 44 for fixing a partial reflector 48 and a gas introducing unit 49a. The fixed block unit 44 is disposed at the end of the laser tube 25, and the gas introducing unit 49a is disposed between the two electrodes 41, 42 and 41a, 42a disposed on the laser tube 25a. Therefore, a discharge region is formed between a pair of electrodes 41a and 42a close to the partial reflection unit 44 and to a gas inlet port 28 of the gas introducing unit 49a. In the second embodiment, the electrodes 41a, 42a for generating discharge region are disposed to have an interval L3 of 120 mm or more, and preferably about 120 mm. The intervals L3 shows a distance between the end position of the electrodes 41a, 42a and the inner surface of the partial reflector 48 as shown in FIG. 9.

Figure 10:
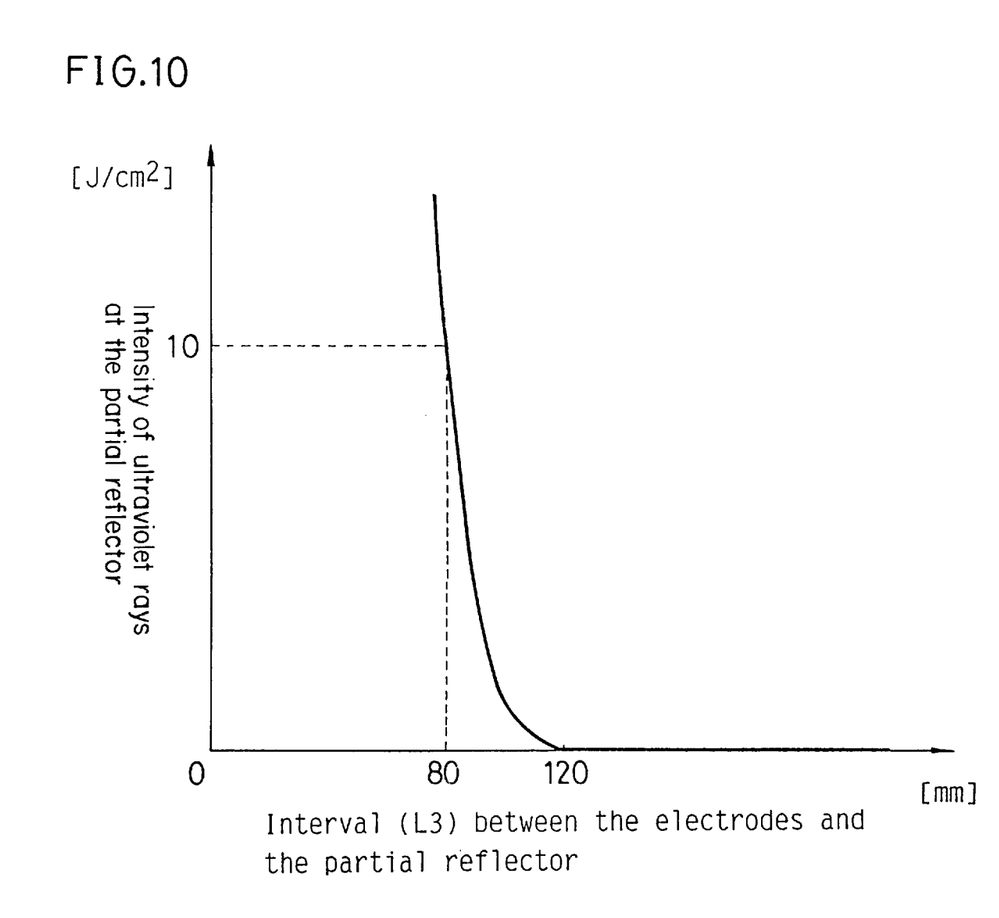
FIG. 10 is a graph showing a relation between the intensity of ultraviolet rays and a position of a partial reflector to a discharge region.

FIG. 10 is a graph showing a relation between intensity of ultraviolet rays at an inner surface of the partial reflector 48 and the interval L3.

The graph of FIG. 10 shows data obtained by measuring the intensity of ultraviolet lays from the discharge region formed between the two electrodes 41a, 42a in the following conditions:

The laser tube 25 of this example has an inside diameter of 40 mm, a pressure of 150 Torr of the laser gas is applied, and an output power of the gas laser oscillator is 2.5 kW.

As is apparent from the graph of FIG. 10, in a case where the electrodes 41a, 42a and the partial reflector 48 are arranged to have the interval L3 less than 120 mm, more ultraviolet rays are received by the inner surface of the partial reflector 48 as the interval L3 is shorter. However, if the interval L3 is more than 120 mm, the intensity of ultraviolet lays received by the partial reflector 48 is substantially zero.

According to the inventor's experiments, the above-mentioned relation shown in FIG. 10 also applies in the following conditions:

The laser tube 25 has an inside diameter of below 40 mm, a pressure of below 150 Torr of the laser gas is applied, and an output power of the gas laser oscillator is below 2.5 kW.

By configurating the gas laser oscillator of the second embodiment with the partial reflection unit 21a so as to form the discharge region at the interval L3 of 120 mm or more from the partial reflector 48, the partial reflector 48 does not receive the harmful influence of the ultraviolet rays from the discharge region, and is prevented from deterioration by the ultraviolet rays.

Apart from the above-mentioned second embodiment, wherein the partial reflector 48 is arranged to have the interval L3 of 120 mm or more from the discharge region, a modified embodiment may be such that return-beam reflectors and/or a total reflector is arranged to have an interval of 120 mm or more from a discharged region. Therefore, the above-mentioned gas laser oscillator of the second embodiment provides return-beam reflectors and/or a total reflector that are/is not deteriorated by the ultraviolet rays, nor soiled by the floating powders etc. in the laser gas, thereby increasing the life of the gas laser oscillator.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications that fall within the true spirit and scope of the invention.

What is claimed is:

1. A gas laser oscillator comprising:
   a laser tube in which laser gas is circulated;
   a partial reflection unit disposed at a first end of said laser tube, said partial reflection unit including a partial reflector for reflecting and outputting a laser beam from said laser tube;
   a total reflection unit disposed at a second end of said laser tube, said total reflection unit including a total reflector for reflecting said laser beam in said laser tube;
   a pair of electrodes at least partially surrounding said laser tube; and a first gas introducing unit that provides a majority of recirculated laser gas to said laser tube, said gas introducing unit including a first gas inlet port defined in said laser tube and arranged to provide said recirculated laser gas to said first end of said laser tube, said first gas inlet port being located in said laser tube at a position relative to said partial reflector such that, as said laser gas is introduced to said laser tube via said first gas inlet port, said laser gas disposed in a first portion of said laser tube between said first gas inlet port and said partial reflector stands stagnant, said first gas inlet port being disposed relative to said partial reflector such that a center of said first gas inlet port is at least 120 mm from an inner surface of said partial reflector, said laser tube having an inside diameter that is at most 40 mm, said laser gas flowing at a speed of at most 300 m/sec through said laser tube, and a pressure of said laser gas being at most 150 Torr, thereby making said laser gas stagnant in front of said partial reflector to substantially eliminate particulate matter carried in said laser gas that sticks to said partial reflector during operation of said gas laser oscillator.

2. A gas laser oscillator in accordance with claim 1, further comprising:

a second gas introducing unit including a second gas inlet port defined in said laser gas tube and arranged to introduce said laser gas into said second end of said laser tube, said second gas inlet port being disposed relative to said total reflector such that a center of said first gas inlet port is at least 120 mm from an inner surface of said total reflector such that, as said laser gas is introduced into said laser tube via said first gas inlet port, said laser gas disposed in a second portion of said laser tube between said second gas inlet port and said total reflector stands stagnant, thereby substantially eliminating particulate matter carried in said laser gas that sticks to said total reflector during operation of said gas laser oscillator.

3. A gas laser oscillator in accordance with claim 1, further comprising:

a return-beam reflection unit including at least two return-beam reflectors being aligned to provide a return-beam reflection between said partial reflector and said total reflector.

4. A gas laser oscillator in accordance with claim 3, further comprising:

a third gas introducing unit including at least one third gas inlet port defined in said laser tube and arranged to introduce said laser gas into said laser tube, said third gas inlet port being disposed relative to said return beam reflector such that a center of said first gas inlet port is at least 120 mm from an inner surface of said return-beam reflector such that, as said laser gas is introduced to said laser tube via said third gas inlet port, said laser gas disposed in a third portion of said laser tube between said third gas inlet port and said return-beam reflector stands stagnant, thereby substantially eliminating particulate matter carried in said laser gas that sticks to said return-beam reflector during operation of said gas laser oscillator.

5. A gas laser oscillator comprising:

a laser tube in which laser gas is circulated;

a partial reflection unit disposed at a first end of said laser tube, said partial reflection unit including a partial reflector for reflecting and outputting a laser beam from said laser tube;

a total reflection unit disposed at a second end of said laser tube, said total reflection unit including a total reflector for reflecting said laser beam in said laser tube;

a pair of electrodes at least partially surrounding said laser tube; and a gas introducing unit that provides a majority of recirculated laser gas to said laser tube, said gas introducing unit including a first gas inlet port defined in said laser gas tube and arranged to provide said recirculated laser gas to said first end of said laser tube, said first gas inlet port being disposed relative to said partial reflector such that a center of said first gas inlet port is at least 120 mm from an inner surface of said partial reflector, said laser tube having an inside diameter that is at most 40 mm, said laser gas flowing at a speed of at most 300 m/sec through said laser tube, and a pressure of said laser gas being at most 150 Torr such that a pressure difference between a center area of said surface of said partial reflector and a peripheral area of said surface of said partial reflector during operation of said gas laser oscillator is substantially zero, thereby making said laser gas stagnant in front of said partial reflector to substantially eliminate particulate matter carried in said laser gas that sticks to said partial reflector during operation of said gas laser oscillator.

6. A gas laser oscillator comprising:

a laser tube in which laser gas is circulated;

a partial reflection unit disposed at a first end of said laser tube, said partial reflection unit including a partial reflector for reflecting and outputting a laser beam from said laser tube;

a total reflection unit disposed at a second end of said laser tube, said total reflection unit including a total reflector for reflecting said laser beam in said laser tube;

a pair of electrodes at least partially surrounding said laser tube, wherein, during operation of said gas laser oscillator, a discharge region is produced between said pair of electrodes and ultraviolet rays are emitted from said discharge region; and a gas introducing unit that provides a majority of recirculated laser gas to said laser tube, said gas introducing unit including a first gas inlet port defined in said laser gas tube and arranged to provide said recirculated laser gas to said first end of said laser tube, said first gas inlet port being disposed relative to said partial reflector such that a center of said first gas inlet port is at least 120 mm from an inner surface of said partial reflector, said laser tube having an inside diameter that is at most 40 mm, said laser gas flowing at a speed of at most 300 m/sec through said laser tube, and a pressure of said laser gas being at most 150 Torr such that an intensity of said ultraviolet rays received by said partial reflector during operation of said gas laser oscillator is substantially zero, thereby making said laser gas stagnant in front of said partial reflector to substantially eliminate particulate matter carried in said laser gas that sticks to said partial reflector during operation of said gas laser oscillator.

7. A gas laser oscillator comprising:

a laser tube in which laser gas is circulated;

a partial reflection unit disposed at a first end of said laser tube, said partial reflection unit including a partial reflector for reflecting and outputting a laser beam from said laser tube;

a total reflection unit disposed at a second end of said laser tube, said total reflection unit including a total reflector for reflecting said laser beam in said laser tube;

a pair of electrodes at least partially surrounding said laser tube; and a gas introducing unit that provides a majority of recirculated laser gas to said laser tube, said gas introducing unit including a first gas inlet port defined in said laser tube and arranged to provide said recirculated laser gas to said second end of said laser tube, said first gas inlet port being disposed relative to said total reflector such that a center of said first gas inlet port is at least 120 mm from an inner surface of said total reflector, said laser tube having an inside diameter that is at most 40 mm, said laser gas flowing at a speed of at most 300 m/sec through said laser tube, and a pressure of said laser gas being at most 150 Torr such that a pressure difference between a center area of said surface of said total reflector and a peripheral area of said surface of said total reflector during operation of said gas laser oscillator is substantially zero, thereby making said laser gas stagnant in front of said partial reflector to substantially eliminate particulate matter carried in said laser gas that sticks to said total reflector during operation of said gas laser oscillator.

8. A gas laser oscillator comprising:

a laser tube in which laser gas is circulated;

a partial reflection unit disposed at a first end of said laser tube, said partial reflection unit including a partial reflector for reflecting and outputting a laser beam from said laser tube;

a total reflection unit disposed at a second end of said laser tube, said total reflection unit including a total reflector for reflecting said laser beam in said laser tube;

a return-beam reflection unit including at least two return-beam reflectors which are aligned to provide a return-beam reflection between said partial reflector and said total reflector;

a pair of electrodes at least partially surrounding said laser tube; and a gas introducing unit that provides a majority of recirculated laser gas to said laser tube, said gas introducing unit including a first gas inlet port arranged to provide said recirculated laser gas to said laser tube, said first gas inlet port being disposed relative to said return-beam reflector such that a center of said first gas inlet port is at least 120 mm from an inner surface of said return-beam reflector, said laser tube having an inside diameter that is at most 40 mm, said laser gas flowing at a speed of at most 300 m/sec through said laser tube, and a pressure of said laser gas being at most 150 Torr such that a pressure difference between a center area of said surface of said return-beam reflector and a peripheral area of said surface of said return-beam reflector during operation of said gas laser oscillator is substantially zero, thereby making said laser gas stagnant in front of said return-beam reflector to substantially eliminate particulate matter carried in said laser gas that sticks to said return-beam reflector during operation of said gas laser oscillator.

9. A method of operating a gas laser oscillator comprising the steps of:

providing a laser tube having a partial reflector disposed at a first end of said laser tube, a total reflector disposed at a second end of said laser tube, and a pair of electrodes at least partially surrounding said laser tube; and introducing, during operation of said gas laser oscillator, a majority of recirculated laser gas to said laser tube via a first gas inlet port, wherein said introducing of said majority of said recirculated laser gas is accomplished by providing said majority of said recirculated laser gas to said laser tube via said first gas inlet port, said first gas inlet port being disposed relative to said partial reflector such that a center of said first gas inlet port is at least 120 mm from an inner surface of said partial reflector, said laser tube having an inside diameter that is at most 40 mm, said laser gas flowing at a speed of at most 300 m/sec through said laser tube, and a pressure of said laser gas being at most 150 Torr such that, as said laser gas is introduced to said laser tube via said first gas inlet port, said laser gas disposed in a first portion of said laser tube between said first gas inlet port and said partial reflector stands stagnant, thereby making said laser gas stagnant in front of said partial reflector to substantially eliminate particulate matter carried in said laser gas that sticks to said partial reflector during operation of said gas laser oscillator.

10. A method of operating a gas laser oscillator in accordance with claim 9, further comprising a step of:

introducing, during operation of said gas laser oscillator, said laser gas to said laser tube via a second gas inlet port located at a position relative to said total reflector such that, as said laser gas is introduced to said laser tube via said second gas inlet port, said laser gas disposed in a second portion of said laser tube between said second gas inlet port and said total reflector stands stagnant, said second gas inlet port being disposed relative to said total reflector such that a center of said second gas inlet port is at least 120 mm from an inner surface of said total reflector, said laser tube having an inside diameter that is at most 40 mm, said laser gas flowing at a speed of at most 300 m/sec through said laser tube, and a pressure of said laser gas being at most 150 Torr, thereby making said laser gas stagnant in front of said total reflector to substantially eliminate particulate matter carried in said laser gas that sticks to said total reflector during operation of said gas laser oscillator.

11. A method of operating a gas laser oscillator in accordance with claim 9, wherein said laser gas tube includes at least two return-beam reflectors which are aligned to provide a return-beam reflection between said partial reflector and said total reflector, further comprising a step of:

introducing said laser gas, during operation of said gas laser oscillator, via a second gas inlet port located at a position relative to said return-beam reflectors such that, as said laser gas is introduced to said laser tube via said second gas inlet port, said laser gas disposed in a second portion of said laser tube between said second gas inlet port and said return-beam reflectors stands stagnant, said second gas inlet port being disposed relative to said return-beam reflectors such that a center of said second gas inlet port is at least 120 mm from an inner surface of said return-beam reflectors, said laser tube having an inside diameter that is at most 40 mm, said laser gas flowing at a speed of at most 300 m/sec through said laser tube, and a pressure of said laser gas being at most 150 Torr, thereby making said laser gas stagnant in front of said return-beam reflectors to substantially eliminate particulate matter carried in said laser gas that sticks to said return-beam reflectors during operation of said gas laser oscillator.

* * * * *